United States Patent [19]
Mugford

[11] 3,802,169
[45] Apr. 9, 1974

[54] AIR FILTER ASSEMBLY

[75] Inventor: Charles C. Mugford, Hermosa Beach, Calif.

[73] Assignee: Farr Company, El Segundo, Calif.

[22] Filed: Mar. 2, 1971

[21] Appl. No.: 120,079

[52] U.S. Cl............... 55/484, 55/498, 55/500, 55/521, 210/493
[51] Int. Cl............................................. B01d 27/06
[58] Field of Search...... 55/482, 483, 484, 497–500, 55/514, 521; 210/493, 487

[56] References Cited
UNITED STATES PATENTS

| | | | |
|---|---|---|---|
| 1,714,854 | 5/1929 | Dollinger | 55/484 |
| 3,058,594 | 10/1962 | Hultgren | 210/493 |
| 3,124,440 | 3/1964 | Hogg | 55/484 |
| 3,378,994 | 4/1968 | Farr | 55/443 |
| 3,402,531 | 9/1968 | Farr | 55/521 |
| 3,490,211 | 1/1970 | Cartier | 55/521 |
| 3,641,774 | 2/1972 | Culbert et al. | 55/385 |
| 3,631,582 | 1/1972 | Lucas et al. | 55/521 |

FOREIGN PATENTS OR APPLICATIONS
1,275,496  10/1961  France.................... 55/484

Primary Examiner—Bernard Nozick
Attorney, Agent, or Firm—Lyon & Lyon

[57] ABSTRACT

A compact filter assembly for providing a large filter area in a relatively small and inaccessible space, the assembly includes a housing having an air inlet and air outlet means with a plurality of filter elements in the housing separating the air inlet and air outlet means. Each filter element includes a sheet of pleated filter media arranged in a closed loop to form a rigid hollow columnar member which is sealably secured at each end to the housing, with the interior of each filter element defined by the hollow columnar member in communication with the air outlet means. Thus, air entering the air inlet of the housing flows radially inward through the columns of filter media into the interior of the elements and axially therefrom through the air outlet means.

11 Claims, 6 Drawing Figures

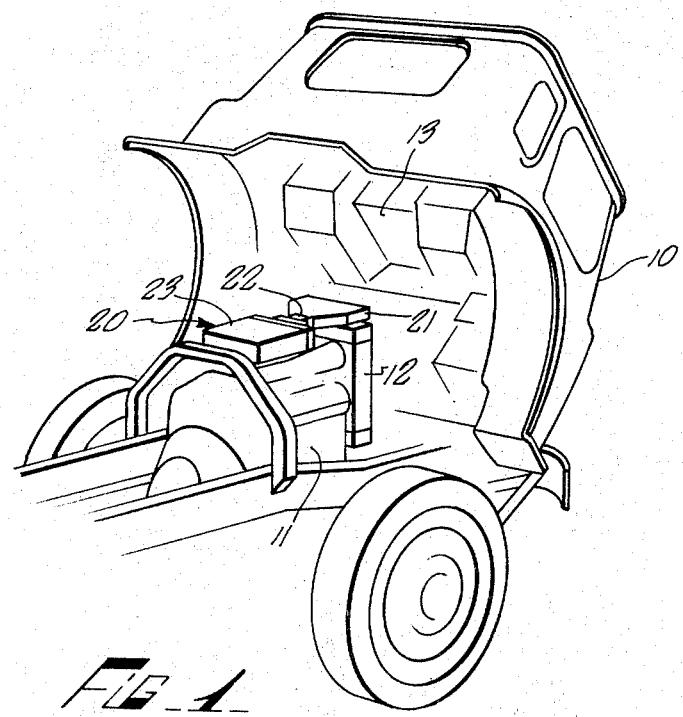
FIG_1
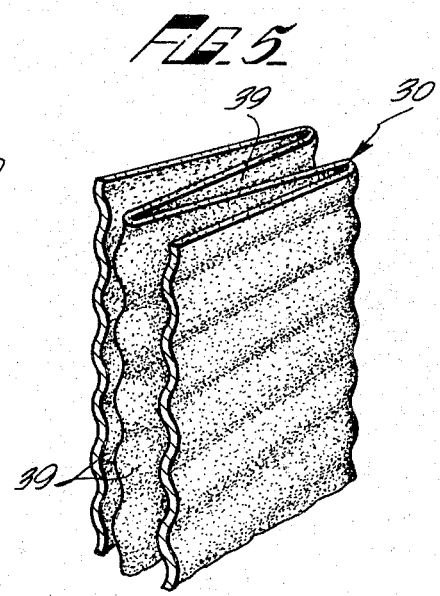
FIG_5
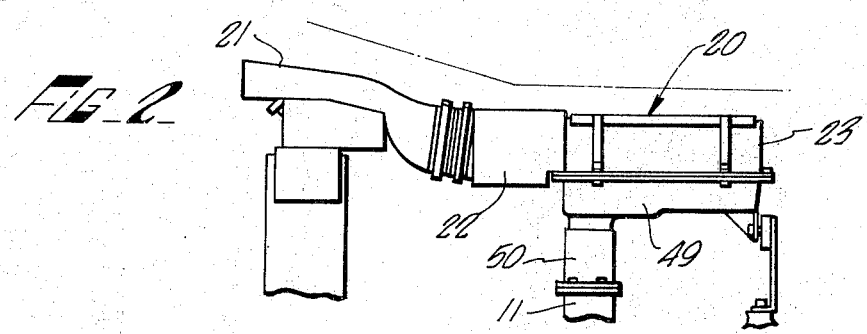
FIG_2
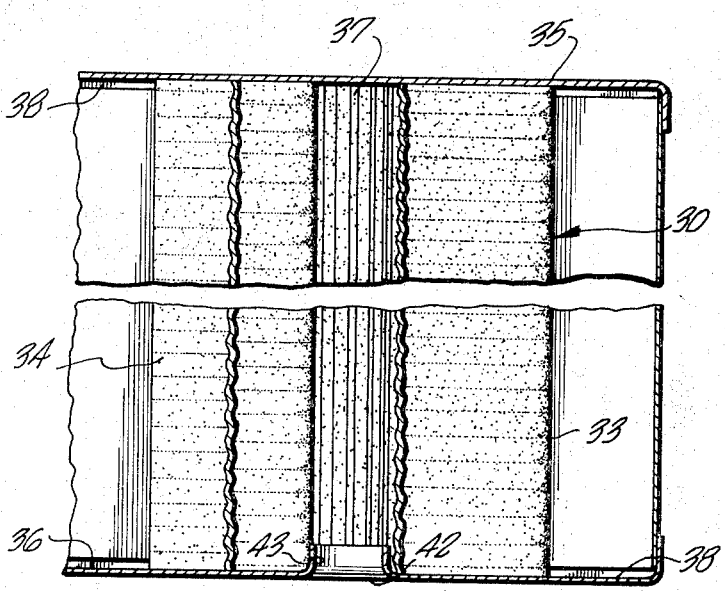
FIG_6
INVENTOR.
CLIFFORD C. MUGFORD
BY
Lyon+Lyon
ATTORNEYS.

INVENTOR.
CLIFFORD C. MUGFORD
BY
Lyon+Lyon
ATTORNEYS.

AIR FILTER ASSEMBLY

This invention relates to an air filter and is particularly directed to a durable compact filter having a relatively large filter area which is adapted to fit within a relatively small space such as the engine compartment of a truck and which is further adapted to withstand engine vibrations and other stress conditions connected with the operation of a large, high-horsepower engine.

The necessity of filtering the intake air for internal combustion engines to prevent damage and premature wear is well known. For large trucks there are a number of factors which dictate the necessity of providing an intake air filter having high dust-removal efficiency such as: the high cost of the truck engine, the adverse environmental conditions commonly encountered, the high number of operating hours, the expected dependability of engine operation, etc. Moreover, the high volumetric rate of air ingestion of internal combustion engines for large trucks requires the air filter to have high air flow capacity. As a result of these requirements, the conventional air filters for large trucks are usually of such a large size to preclude the mounting of the filter directly on the engine or, in many situations, even within the engine compartment. Thus, ducting must be provided for conducting the air from the filter to the intake which produced an air pressure drop and results in a reduction in engine efficiency. Moreover this ducting is prone to develop leaks and admit unfiltered air to the engine.

There is at least one filter which meets the required filter area necessary for high dust-removal efficiency and is yet sufficiently compact enough to be mounted directly on the engine. This filter is illustrated, described and claimed in the currently pending United States patent application, Ser. No. 843,587 now U.S. Pat. No. 3,641,744 issued Feb. 15, 1972 of Robert M. Culbert and Richard V. Southworth entitled Air Filter for Trucks. While this particular filter overcomes most of the objectionable features of the other larger filter units and is satisfactory for most purposes, it has been found that the direct engine mounting in certain particular instances creates certain additional problems, the most prevalent of which involves a failure of the filter housing which supports and houses the filter cartridge due to a pulsating air flow created in certain high horsepower engines and the engine vibrations which together act on the housing over a long period of time. Another problem involves damage to the filter media seals due to the engine vibrations.

Therefore, it is a principal object of this invention to provide a novel form of intake air cleaner of a sufficiently compact size for mounting in a relatively small space and having a self-contained, durable filter cartridge which is adapted to withstand the pulsating air flow and engine vibrations. A further object of this invention is to provide a large area of filter media arranged in a structurally rigid manner whereby the media is adapted to provide support for the sidewalls of the cartridge. Another object of this invention is to arrange the media in a manner which permits the ends and edges of the media to be sufficiently sealed and resists failure of the seals due to vibrations and other stress conditions.

Still another object of this invention is to provide a compact air filter for large trucks adapted to be mounted directly on the engine air intake comprising a generally flat rectangular cartridge with an air inlet, air outlet means in communication with the engine air intake, and a plurality of filter elements in the cartridge separating the air inlet and air outlet means and each including a pleated paper filter media which is arranged in a structurally rigid manner. A still further object of this invention is to arrange the pleated filter media of each element in a closed and elongated loop to provide a continuous filter media surface through which air flows having a substantially greater straight portion than curved portion in order to maximize the media surface per the available space and minimize the air pressure drop as air flows through the media.

A still further object of this invention is to provide an air filter which requires no filter cartridge housing or enclosure and which instead comprises a durable, self-contained unit having a filter cartridge which fully protects the paper media during shipping and installation.

Other objects and advantages of this invention will appear from the following description and the accompanying drawings, wherein:

FIG. 1 is a perspective view of the engine compartment of a large truck of the "cab-over" type illustrating the air filter of this invention mounted on top of the engine.

FIG. 2 is side view illustrating the mounting of the air filter in the engine compartment with phantom lines indicating the approximate position of the lower portion of the cab forming the top of the engine compartment.

FIG. 5 is an exploded partial view of the pleated filter media illustrating air inlet passages provided in the media.

FIG. 6 is an exploded sectional view taken substantially on the lines 6—6 of FIG. 3.

Figure 3:
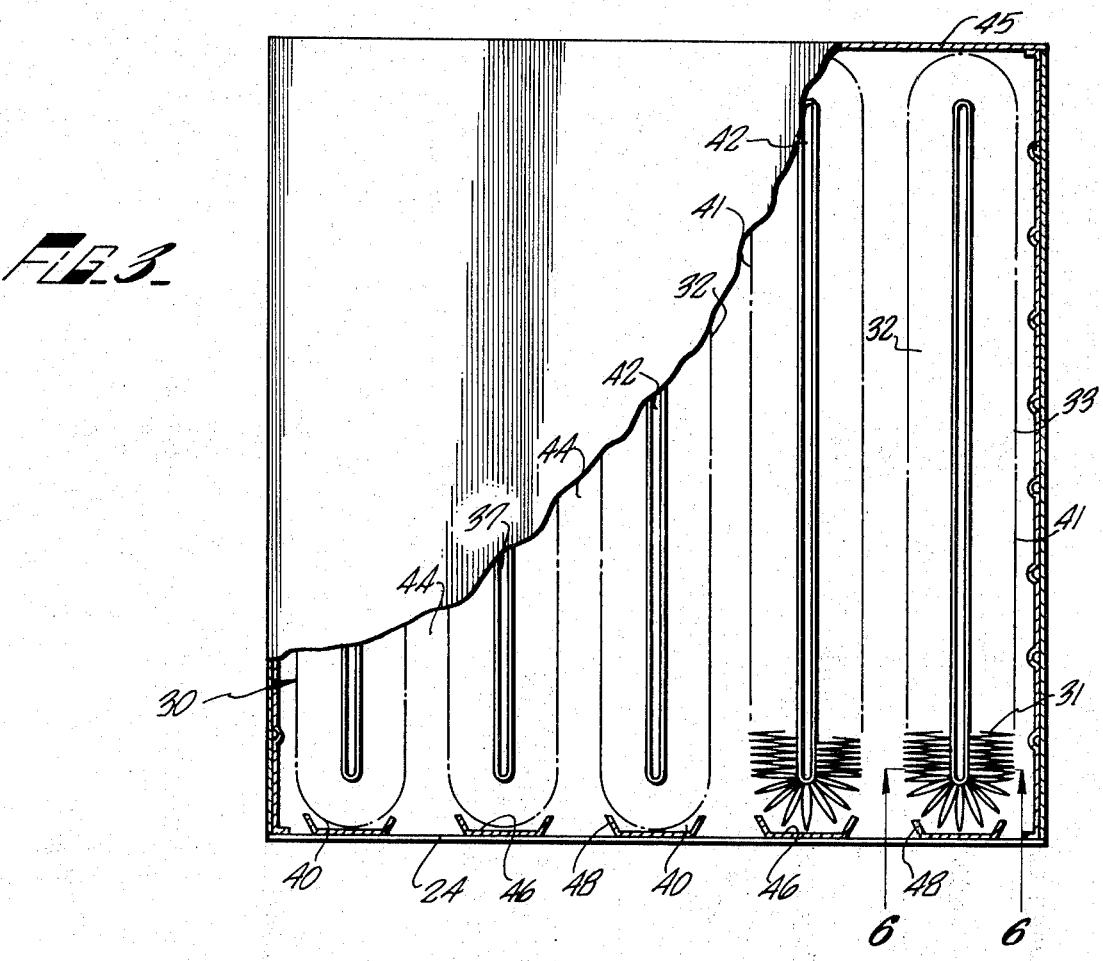
FIG. 3 is a top view with the top of the air filter cartridge partially cut away to illustrate the arrangement of the filter elements.

It should be noted that the drawings illustrate a particular form of the air filter of this invention having a specific shape and mounting arrangement specifically adapted to fit one model of truck. However, it will be readily understood by those skilled in the art that by appropriate modifications to the size and shape of the cartridge, flanges, and the like, the air filter assembly of this invention may be adapted for use in other arrangements with equally advantageous results.

Referring now more particularly to FIG. 1, the truck is illustrated with the cab 10 in the raised position to expose the engine 11 from the rear. The radiator 12 is positioned immediately in front of the engine. When the cab 10 is lowered into operating position the underside of the cab as viewed in FIGS. 1 and 2 forms the engine compartment and surrounds the engine relatively closely. Part of the engine compartment includes the central engine tunnel portion 13 which from the interior of the cab 10 comprises a substantially raised portion between the driver and passenger positions of the cab. This engine tunnel portion 13 is conventionally sized by the truck manufacturer to provide a minimum clearance between the engine and such portion whereby the engine tunnel portion 13 presents a minimum of obstruction within the cab 10. It is this minimal space between the engine and the walls of the engine compartment including the engine tunnel portion 13 that precludes the installation of larger truck air filters directly on top of the engine or, in several instances, even within the engine compartment.

Referring to both FIGS. 1 and 2, the air filter of this invention is generally designated 20 and is shown mounted in position on the engine 11. The minimal space between the engine 11 and the engine tunnel 13 is diagrammatically shown in FIG. 2 and it is within this space that the compact air filter 20 of this invention is mounted. An air intake duct or scoop 21 extends from an air moisture separator 22 at the front of the housing of the air filter 20 to an air inlet (not shown) at the front of the cab 10. The intake 23 of the scoop 21 is preferably positioned above the radiator 12 to permit intake of the air without it being heated by the radiator 12 and engine 11 prior to introduction to the air filter. Moreover, the provision of this substantially unrestricted air intake at the front of the vehicle produces an advantageous air ram effect which forces air into the engine when the truck is in motion to provide a maximum of air to the engine.

Figure 4:
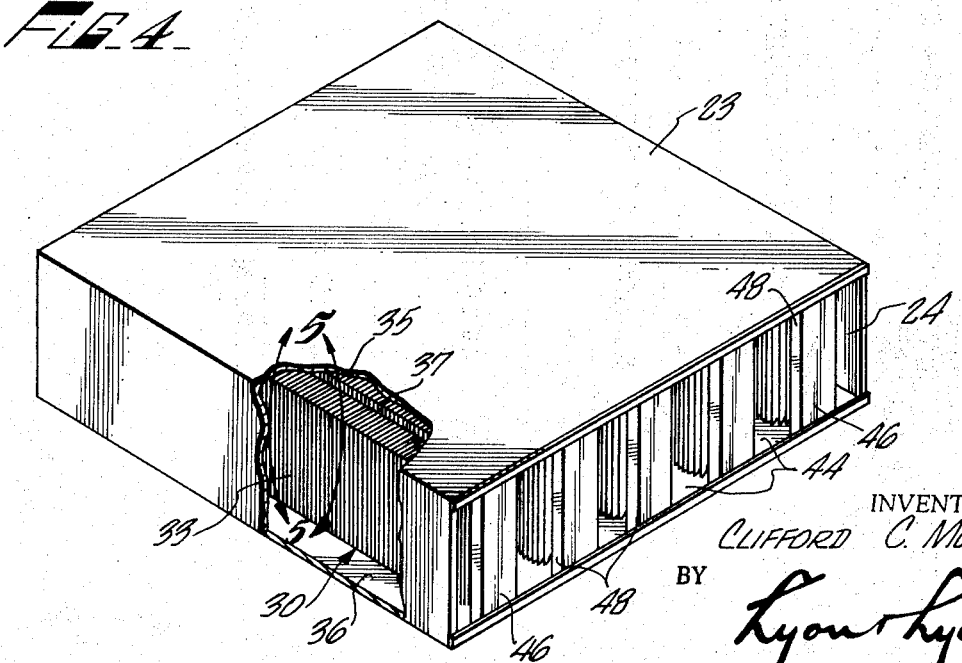
FIG. 4 is a perspective view of the air filter assembly illustrating the air intake with a section broken away to illustrate the arrangement of the filter media.

Referring now more particularly to FIGS. 3–6, the air filter 20 of this invention includes a generally rectangular cartridge 23 substantially greater horizontal width and length than vertical thickness and may be of any convenient material such as sheet metal. One end 24 of the cartridge 23 is substantially open to provide an air inlet and this air inlet end 24 is preferably connected to the downstream side of the air moisture separator 22. The air moisture separator 22 is adapted to remove excess moisture in incoming air taken from the extreme front of the truck and which could otherwise damage the media of the filter. For certain applications this moisture separator, which forms no part of the present invention, may be eliminated although, as indicated, its use is usually preferred.

The required air filtration efficiency without excessive pressure drop through the filter 20 is achieved by a plurality of filter elements, generally designated 30, which, as illustrated, occupy most of the filter housing 23. Each filter element 30 includes a strip or run of pleated paper filter media 31 arranged in a closed elongated loop 32 to provide a maximum of filter media surface 33 and to form a structurally rigid hollow column 34 which extends between the top and bottom sidewalls 35 and 36, respectively, of the filter housing 23. The sidewalls 35 and 36, which are structurally supported by the filter elements 30, serve to insure that all of the air entering the interior 37 of each element 30 from the air inlet 24 must pass radially inward through the filter paper rather than leaking past the ends. To this end the sidewalls 35 and 36 are molded to the elements 30 by a liquid which cures or "hardens" to a relatively soft and flexible plastic or rubber-like material 38 with the ends of the pleated column of filter paper 31 embedded in the material to an adequate depth to insure a complete seal.

Moreover, this flexible material permits a certain degree of limited movement of the components parts of the filter and also dampens or deadens vibrations or pulses generated by the engine. It should be specifically noted that because of the rigid structural nature of the formed columns 33 of filter media that each element 30 can be mounted in stress between the sidewalls 35 and 36, and this serves to support these flat sheet metal sidewalls. Moreover, because the sidewalls of the cartridge can be supported in this manner there is no need to provide a separate housing or enclosure for the cartridge. In addition because the sidewalls are securely supported there will be less of a tendency for the seams of the cartridge to come apart due to the pulsating air flow and engine vibrations. Also, the ends of the columns are sufficiently stiff as aid in the forming of the proper seals and thereby prevent a failure of the seals due to engine vibrations or other stresses caused during operating conditions.

As illustrated, the pleated filter media 31 of each element 30 forms a multiplicity of converging and diverging passages 39 through which the air passes as it flows from the housing into the interior 37 of each element 30. Generally throughout the loop 32 of media the passages 39 are uniform, however, it should be noted that at the curved ends of the loop 32 the pleates at the interior of the column are bunched together and thereby restrict the passages into the interior 37. Therefore, in order to limit this restriction of the passages as much as possible and thereby prevent an undesirable air pressure drop, the curved portions or ends 40 of the media surface 33 are limited and the straight portions or sides 41 of the media surface are extended. This is accomplished by arranging each strip of pleated media in an elongated loop as illustrated where the major axis of the loop is substantially greater than the minor axis of the loop. It is also very important to note that this particular shape maximizes the inlet and outlet filter media surface area for the space available. Thus, a loop of media having a substantially greater length than width is distinguished from both a single column of media having a circular cross-section and a plurality of columns of media each having a circular cross-section. It is evident that a plurality of circular columns of media in a given space will provide a maximum of inlet media surface area, however, because of the dimensional thickness of the strip of pleated media or the distance between the exterior and the interior of the column the desired amount outlet filter media surface area will not be provided. On the other hand, the single circular column will provide a maximum of outlet filter media surface area for a particular given space, but it will not provide the desired inlet filter media surface area. Moreover, in order to maintain the desired spacing within the passages 39 the filter paper is preferably corrugated with the corrugations running counter to the pleats. The interference between the various corrugations provides the necessary space in the passages 39.

Bottom sidewall 36 is provided with elongated air outlet openings 42 for aligning with the elements 30 to receive the air from the interior of the elements 30 whereas top sidewall 35 completely closes the end of each filter element 30. A flange 43 adjacent each opening 42 extends into the interior of each hollow column of media and acts to prevent an inward collapse of the hollow columns 34, each of which encircles at one end an outlet opening 42 and flange 43. Thus, with the closed loops of media forming a continuous surface of media around each outlet 42, even if leaks should develop in the seams of the filter cartridge the air will still be required to pass through the filter media before exiting out through an outlet.

The filter elements 30 are completely enclosed by the sheet metal sidewalls and a sheet metal end wall 45 of the cartridge and thus protected during shipping and installation. The filter elements 30 are arranged parallel to each other in the cartridge 23 and spaced apart to provide passageways 44 therebetween. The filter elements 30 extend longitudinally from the air inlet end 24 to the rear end 45 of the cartridge, with the straight side portions 41 of the media surface 33 extending substantially parallel to the incoming air flow and the curved end portions 40 of one end of each element 30 extending across the air inlet 24. In order to more uniformly distribute the incoming air to the filter media surface 33 of each element and to prevent a direct flow of incoming air through the curved end portion 40 of each element at the inlet and 24, the inlet end 24 of the cartridge 23 is provided with a baffle member 46 adjacent the upstream curved end portion 40 of each filter element 30. Each baffle member 46 comprises a generally flat front plate 47 which extends across the inlet opening 24 between the top and bottom sidewalls 35 and 36, and covers a curved end portion 40 and diverging sides 48 which direct the incoming air into the passageways 44.

The filter cartridge 23 is adapted to be mounted on an outlet plenum 49 which encloses the entire bottom sidewall 36 and thus the outlet openings 42. The plenum 49 is in turn provided with outlets 50 which communicate directly to the engine air intake. The plenum 49 serves to conduct the filtered air from the air outlets 42 to the engine intake with a minimum pressure drop.

Thus, in operation the air enters at the front of the cab 10, passes through the air intake duct or scoop 21, and the moisture separator 22 into the air inlet of the cartridge 23. The air is then directed into the passageways 46 between the filter elements 30 and along the filter media surfaces 34 whereupon the air flows radially inward through the columnar filter paper into the interior of the elements and then axially out through the air outlet openings 42 into the outlet plenum 49.

It is evident that by this invention there is provided a novel form of air filter particularly adapted to provide a high volumetric capacity of air filtration such as required by large truck engines and yet occupy only a comparatively small space as is typically available in such truck engine compartments. The filter of this invention is adapted for direct mounting on an engine air intake to minimize the ducting and resultant inefficiencies involved with air filters mounted at a remote location on the truck and at the same time is adapted to withstand the vibrations and other severe operating conditions which accompany such a mounting arrangement. Specifically, the filter elements each include a pleated paper filter media arranged in a closed loop to provide a large continuous surface of filter media and a structurally rigid element which can be mounted in stress between the sidewalls of the housing to protect against damage or failure of the cartridge which encloses the filter media.

Having fully described my invention, it is to be understood that I do not wish to be limited to the details herein set forth, but my invention is of the full scope of the appended claims.

I claim:

1. A self-contained filter assembly for filtering the intake air for a combustion engine and adapted to be mounted on the engine, comprising:

a flat filter cartridge having spaced top and bottom sidewalls, two sidewalls extending between said top and bottom sidewalls, an endwall, and an air inlet, said air inlet being positioned between said spaced top and bottom sidewalls;

a plurality of hollow columnar filter elements enclosed by said filter cartridge and extending between said top and bottom sidewalls to provide structural support thereto whereby said cartridge is adapted to withstand engine vibration and flow pulsations, each said columnar filter element formed by a run of pleated paper filter media arranged in a closed elongated loop, said hollow columnar filter elements being stressed in compression between said top and bottom sidewalls and said filter media of said filter elements extending between said sidewalls and perpendicular thereto;

a plurality of air outlet openings in said bottom sidewall;

each said loop providing a substantially large continuous area of filter media which surrounds one of said air outlet openings and each loop being radiused at the front of said cartridge to provide greater inlet area and promote undisturbed air flow;

said ends of each said hollow columnar filter element being flexibly and sealably connected to said sidewalls whereby air from said air inlet must flow radially inward through said filter elements before entering said air outlet openings; and plenum means adapted to communicate air from said air outlet openings to engine air intake.

2. The filter assembly of claim 1, wherein said pleats of said media extend axially along said columnar elements and provide a multiplicity of diverging and converging passageways into the interior of each said filter element, and said filter media being corrugated to maintain a desired spacing in said passageways.

3. The filter assembly of claim 1, wherein a flange member adjacent each said air outlet opening extends into the interior of said hollow columnar filter element around said opening to support said loop of media.

4. The filter assembly of claim 1, wherein each said loop includes a pair of straight sides and a pair of curved ends, said sides being substantially longer than said ends to maximize the inlet and outlet filter media surface area and minimize the pressure drop of air flowing through said media.

5. The filter assembly of claim 4, wherein said filter elements are positioned in said cartridge with said straight sides being parallel and forming air passageways therebetween which extend longitudinally from said air inlet.

6. The filter assembly of claim 5, wherein said air inlet is provided with a plurality of baffles, said baffles covering said curved ends of said loops at said air inlet to prevent the direct flow of air therethrough and to better distribute the incoming air flow around said filter elements.

7. The filter assembly of claim 6, wherein each said baffle is provided with diverging siderails to direct the incoming air into said air passageways between said straight sides of said elements.

8. A self-contained filter assembly for filtering the intake air for a combustion engine and adapted to be mounted on the engine, comprising:

a flat filter cartridge having spaced top and bottom sidewalls, two sidewalls extending between said spaced top and bottom sidewalls, and an air inlet, said air inlet being positioned between said spaced top and bottom sidewalls;

a plurality of hollow columnar filter elements enclosed by said filter cartridge and extending between said top and bottom sidewalls to provide structural support thereto whereby said cartridge is adapted to withstand engine vibration and flow pulsations, each said columnar filter element being in the form of a loop and including a run of pleated paper filter media, said hollow columnar filter elements being stressed in compression between said top and bottom sidewalls and said filter media of said filter elements extending between said top and bottom sidewalls perpendicular thereto;

a plurality of air outlet openings in said bottom sidewall;

each said loop providing a substantially large area of filter media and surrounding one of said air outlet openings and each loop being radiused at the front of said cartridge to provide greater inlet area and promote undisturbed air flow;

said ends of each said hollow columnar filter element being flexibly and sealably connected to said sidewalls whereby air from said air inlet must flow radially inward through said filter elements before entering said air outlet openings; and plenum means adapted to communicate air from said air outlet openings to engine air intake.

9. The filter assembly of claim 8, wherein said pleated media provides a multiplicity of diverging and converging passageways for communication of air into the interior of each said columnar filter element, said media being corrugated with said corrugations running contra to said pleats whereby the interference between said corrugations maintains a desired spacing in said passageways.

10. The filter assembly of claim 8, wherein said cartridge is provided with a flange support adjacent each said air outlet opening, each said flange support adapted to support the interior of one of said hollow columnar filter elements and prevent an inward collapse thereof.

11. The filter assembly of claim 8, wherein a baffle means at said air inlet are included to provide a more uniform distribution of incoming air around said filter element and prevent the direct passage of incoming air through said filter media.

* * * * *